(12) United States Patent
Ferron

(10) Patent No.: US 7,726,667 B2
(45) Date of Patent: Jun. 1, 2010

(54) BICYCLE FOR USE ON SNOW

(76) Inventor: Serge Ferron, 1467, Emilien-Rochette, L'Ancienne Lorette, Quebec (CA) G2E 2V2

(*) Notice: Subject to any disclaimer, the term of this patent is extended or adjusted under 35 U.S.C. 154(b) by 105 days.

(21) Appl. No.: 12/105,026

(22) Filed: Apr. 17, 2008

(65) Prior Publication Data

US 2008/0258414 A1 Oct. 23, 2008

Related U.S. Application Data

(60) Provisional application No. 60/925,675, filed on Apr. 23, 2007.

(51) Int. Cl.
*B62B 13/04* (2006.01)
(52) U.S. Cl. ........................ 280/16; 280/21.1
(58) Field of Classification Search ............. 280/7.12, 280/7.14, 7.17, 7.15, 12.1, 7.16, 21.1, 16, 280/25, 23.1, 22.1, 28.14, 809, 816
See application file for complete search history.

(56) References Cited

U.S. PATENT DOCUMENTS

| | | | | |
|---|---|---|---|---|
| 3,030,123 A * | 4/1962 | Dworak | .................... | 280/14.21 |
| 3,561,783 A * | 2/1971 | Ellett | .................... | 280/16 |
| 3,884,484 A * | 5/1975 | Uhlyarik | .................... | 280/7.12 |
| 6,592,150 B2 * | 7/2003 | Kernan | .................... | 280/809 |
| 6,626,441 B1 * | 9/2003 | Hanson | .................... | 280/7.14 |
| 6,736,414 B2 * | 5/2004 | Farrally-Plourde | .......... | 280/16 |
| 6,783,134 B2 | 8/2004 | Geary | | |
| 6,994,359 B1 * | 2/2006 | Silver | .................... | 280/16 |

FOREIGN PATENT DOCUMENTS

| | | |
|---|---|---|
| EP | 1286877 | 5/2001 |
| GB | 1204966 | 4/1968 |

* cited by examiner

*Primary Examiner*—Paul N Dickson
*Assistant Examiner*—John D Walters

(57) ABSTRACT

A snow bike has a frame which can be either a custom frame or an existing bicycle frame. A pair of footrests consisting of two rods extending perpendicularly from the frame at a location usually set for the pedal means of a bicycle provides a user with a way of resting his feet while using the snow bike.

1 Claim, 4 Drawing Sheets

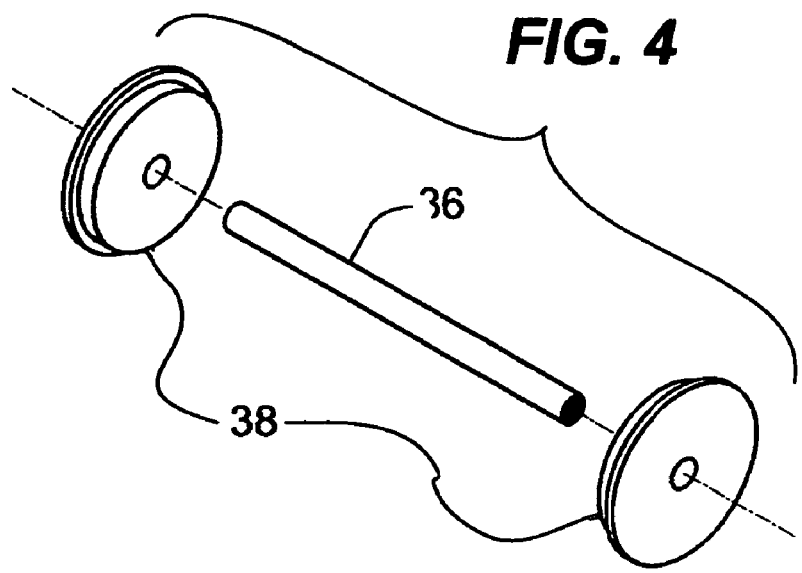
FIG. 4
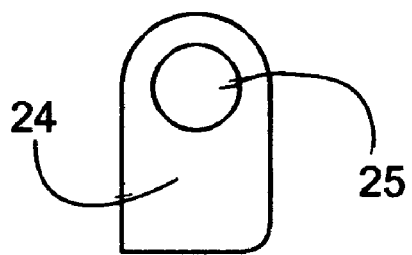
FIG. 7
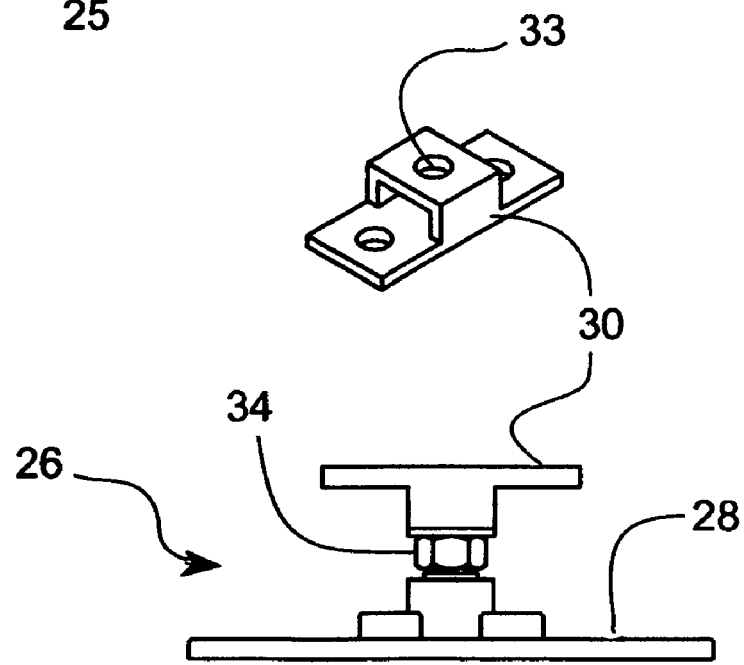
FIG. 8
FIG. 9

BICYCLE FOR USE ON SNOW

This application claims priority based on provisional application 60/925,675 filed Apr. 23, 2007.

FIELD OF THE INVENTION

The present invention relates generally to recreational devices but more particularly to a recreational devices for use on slopes consisting of a bicycle frame having each of its wheel replaced by a snow board like device and used on ski slopes.

BACKGROUND OF THE INVENTION

1. Prior Art Capability and Motivations, as Helping to Show Patentability Here

Even in hindsight consideration of the present invention to determine its inventive and novel nature, it is not only conceded but emphasized that the prior art had many details usable in this invention, but only if the prior art had had the guidance of the present invention, details of both capability and motivation.

That is, it is emphasized that the prior art had/or knew several particulars which individually and accumulatively show the non-obviousness of this combination invention. E.g., a) The cost of the materials are relatively low and do not have a profound impact on price to the point of offsetting the benefits of this novel product;

b) The nature of an invention as being a "novel combination", in spite of existence of details separately, is especially significant here where the novelty is of the plurality of concepts, i.e., the use of an existing bicycle frame and the use of an existing snowboard;

c) The addition of providing a stopper and double spring system to limit rotational mobility of the front part of the snowboard in addition to keeping it level especially when in mid-air and a stabilizer on the rear snowboard to eliminate torsion;

d) The matter of particular cost-factors, in a detailed form which would surely convey the realization of the huge cost benefits involved in manufacturing such a device;

e) The cost-factors involved in the maintenance repair etc since the parts are readily available hardware components;

f) The ease of tooling for the present invention has surely given manufacturers ample incentive to have made modifications for commercial competitiveness in a competitive industry, if the concepts had been obvious;

g) The prior art has always had sufficient skill to make many types of the stuff we're talking about, more than ample skill to have achieved the present invention, but only if the concepts and their combinations had been conceived;

h) Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieve this advantageous invention;

i) The details of the present invention, when considered solely from the standpoint of construction, are exceedingly simple, basically a bicycle frame and a snowboard cut in two halves and the matter of simplicity of construction has long been recognized as indicative of inventive creativity;

j) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and k) The predictable benefits from a novel way of making a snow bike having the features of this invention would seem sufficiently high that others would have been working on this type of product, but only if the concepts which it presents had been conceived.

Accordingly, although the prior art has had capability and motivation, amply sufficient to presumably give incentive to the development a snow bike according to the present invention, the fact remains that this invention awaited the creativity and inventive discovery of the present inventor. In spite of ample motivation, the prior art did not suggest this invention.

2. Prior Art as Particular Instances of Failure to Provide this Novel Product and Installation Method In view of the general economic advantages, of the present invention as an improved embodiment of the prior art, it may be difficult to realize that the prior art has not conceived of the combination purpose and achievement of the present invention, even though the need for it is a known requested commodity for people nowadays who want to have a way of leveraging the use of their bicycle by adapting it to a winter activity. Surely the need for a safe and secure snow bike being able to reproduce on snow the type of acrobatics feasible in a BMX bike has been known for decades and the technology to achieve such results has been known for years and that the various combination provided in this invention would have been desired and attempted long ago, but only if its factors and combination-nature had been obvious.

Other considerations, as herein mentioned, when realistically evaluated show the inventive nature of the present invention, a change in concept which the prior patent and other prior art did not achieve.

SUMMARY OF THE PRIOR ART'S LACK OF SUGGESTIONS OF THE CONCEPTS OF THE INVENTION'S COMBINATION

And the existence of such prior art knowledge and related ideas embodying such various features is not only conceded, it is emphasized; for as to the novelty here of the combination, of the invention as considered as a whole, a contrast to the prior art helps also to remind of needed improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of a the use of an existing bicycle frame and the use of an existing snowboard;

The addition of providing a stopper and double spring system to limit rotational mobility of the front part of the snowboard in addition to keeping it level especially when in mid-air and a stabilizer on the rear snowboard to eliminate torsion and other advantages of the present invention, which are goals only approached by the prior art, must be recognized as being a long-felt need now fulfilled.

Accordingly, the various concepts and components are conceded and emphasized to have been widely known in the prior art as to various installations; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

FEATURES AND ADVANTAGES OF THE INVENTION

It is a main advantage of this invention to provide for a bicycle frame having snowboard like implements to replace wheels and footrests to replace pedals.

The use of an existing bicycle frame and the use of an existing snowboard;

The addition of providing a stopper and double spring system to limit rotational mobility of the front part of the snowboard;

A stabilizer on the rear snowboard to eliminate torsion.

SUMMARY OF THE INVENTION

In view of the foregoing disadvantages inherent in the known devices now present in the prior art, the present invention, which will be described subsequently in greater detail, is to provide objects and advantages which are:

To provide for a snow bike that uses of an existing bicycle frame and the use of an existing snowboard.

The addition of providing a stopper and double spring system to limit rotational mobility of the front part of the snowboard.

A stabilizer on the rear snowboard to eliminate torsion.

To attain these ends, the present invention generally comprises a pair of footrests consisting of two rods extending perpendicularly from said frame at a location usually set for the pedal means of a bicycle.

Front and rear snowboard like implements are each mechanically attached to said frame each by way of mechanical fasteners linking said frame to a bracket.

Said brackets itself being fixedly attached to said snowboard like implements.

The front snowboard implement is mechanically fastened to a fork on the frame by way of a front bracket that is itself mechanically fastened to the front snowboard like implement and rotationally attached to a fork.

The front snowboard like implement has rotational capability along a horizontal axis which is limited by way of a blocker and is biased, by way of a double spring in such a way so as to maintain the front snowboard like implement level.

The rear snowboard like implement is mechanically fastened to the rear of the frame where a rear wheel is usually installed, by way of a rear bracket that is itself mechanically fastened to the rear snowboard like implement.

The front part of the rear snowboard like implement has an anti torsion device which is made out of two distinct and separate parts: a bottom plate, which is fixedly attached to the rear snowboard like implement, and an abutment part which is fixedly attached to a wheel crank mount of the bicycle frame.

The bottom plate has a nut protruding perpendicularly therefrom and which sits within the abutment part by way of an opening.

Both front and rear snowboard like implement have guiding edges to improve the handling of the snow bike.

The footrests consist of a threaded rod passing through the wheel crank mount and two end caps.

The blocker consists in an ablate piece with a hole used when bolting to the fork at the same time as the front bracket is installed and can be adjusted to limit the rotation of the front snowboard like implement to about 50 degrees from the horizontal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 4 Perspective view of the front part of the rear implement.
FIG. 7 Side view of tfte blocker.
FIG. 8 Isometric view of the abutment part.
FIG. 9 Front view of the abutment part installed on the bottom plate.

DETAILED DESCRIPTION

Figure 1:
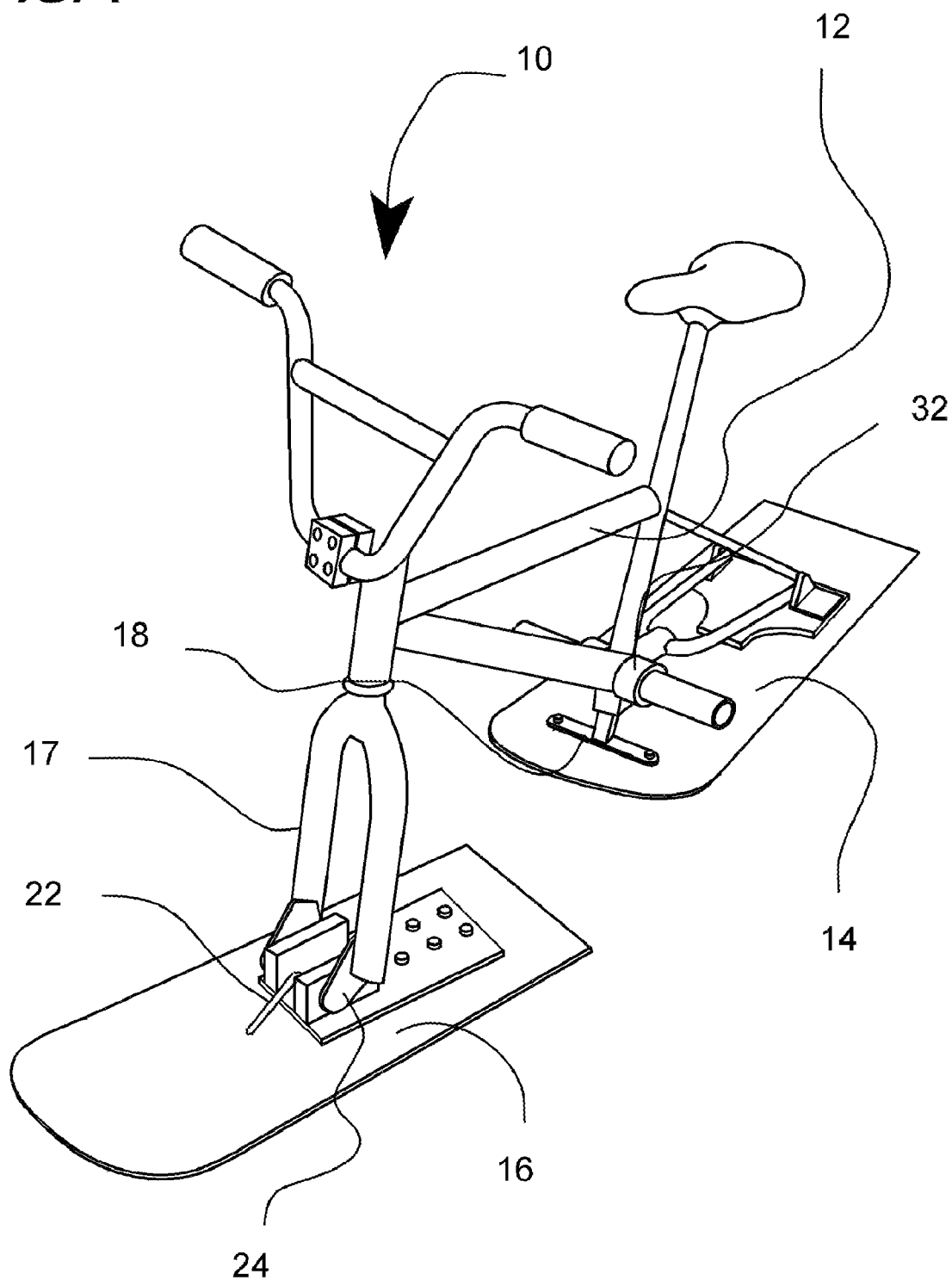
FIG. 1 Perspective view of the invention.
Figure 2:
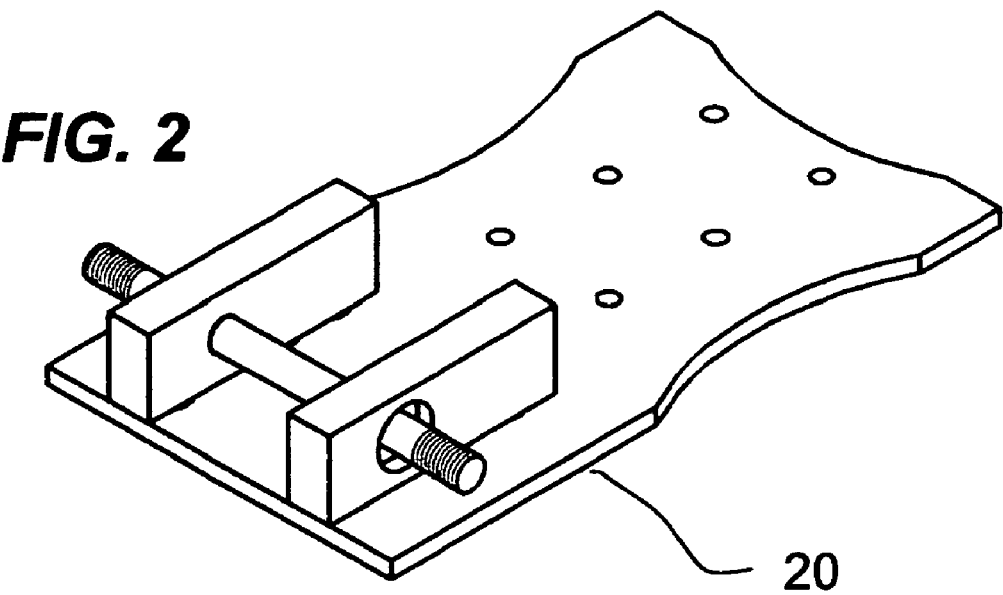
FIG. 2 Perspective detail view of the front implement.
Figure 3:
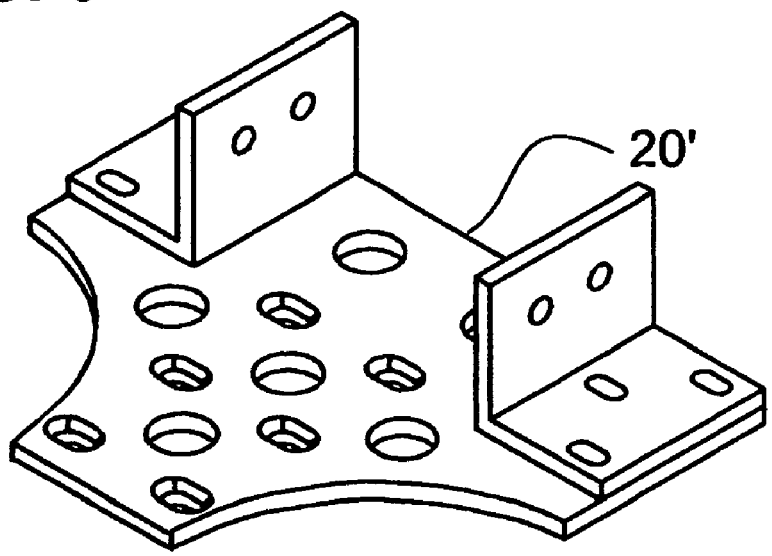
FIG. 3 Perspective view of the rear implement.
Figure 5:
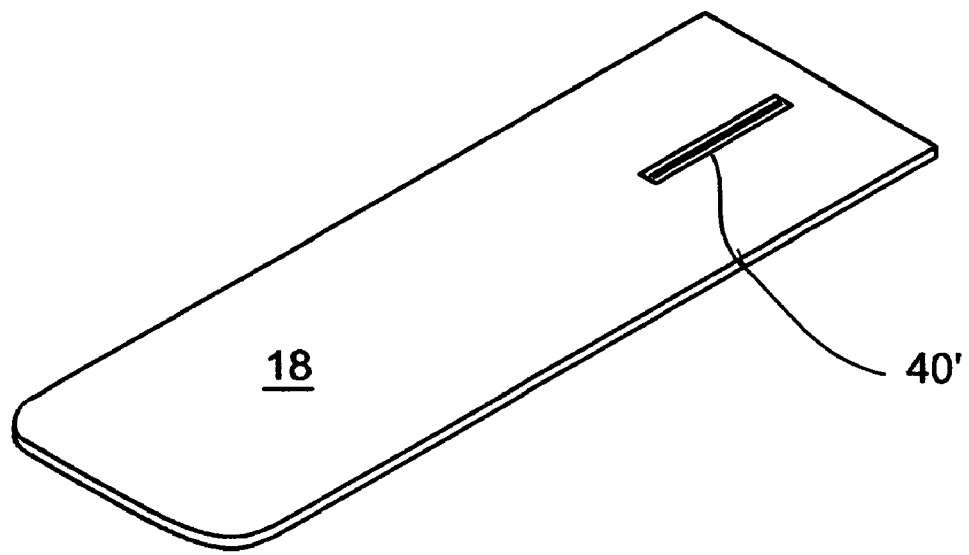
FIGS. 5-6 Top and side views of the front and rear implements and brackets.
Figure 6:
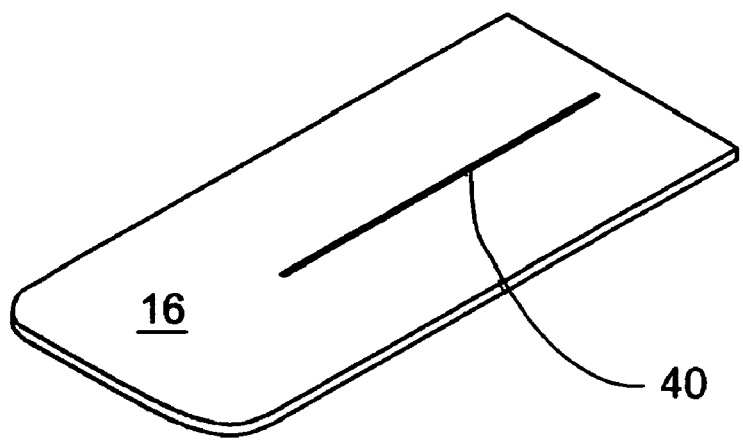

A snow bike (10) has a frame (12) which can be either a custom frame or an existing bicycle frame. A pair of footrests (14), consisting of two rods extending perpendicularly from the frame (12) and at a location usually set for the pedal means of a bicycle, provides a user with a way of resting his feet while using the snow bike (10).

Front and rear snowboard like implements (16, 18) are each mechanically attached to the frame (12). The front snowboard implement (16) is mechanically fastened to a fork (17) on the frame (12) by way of a front bracket (20) that is itself mechanically fastened to the front snowboard like implement (16) and rotationally attached to the fork (17).

The front snowboard like implement (16) has some measure of rotational capability along a horizontal axis which is limited by way of a blocker (24) and is biased, by way of a double spring (22), in such a way so as to maintain the front snowboard like implement (16) as level as possible.

The rear snowboard like implement (18) is mechanically fastened to the rear of the frame (12) where a rear wheel (not shown) is usually installed, by way of a rear bracket (20') that is itself mechanically fastened to the rear snowboard like implement (18).

The front part of the rear snowboard like implement (18) has an anti a bottom plate (28), which is fixedly attached to the rear snowboard like implement (18), and an abutment part (30) which is fixedly attached to a wheel crank mount (32) of the bicycle frame (12). The bottom plate has a nut (34) protruding perpendicularly therefrom and which sits within the abutment part (30) by way of an opening (33). This arrangement prevents the rear snowboard like implement (18) from twisting.

Both front and rear snowboard like implement (16, 18) have guiding edges (40, 40') to improve the handling of the snow bike (10).

The footrests (14) consist of a threaded rod (36) passing through the wheel crank mount (32) and two end caps (38).

The blocker (24) consists in an ablate piece with a hole (25) used when bolting to the fork (17) at the same time as the front bracket (20) is installed and can be adjusted to limit the rotation of the front snowboard like implement (16) to about 50 degrees from the horizontal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A snow bike with a frame and comprised of:
a pair of footrests consisting of two rods extending perpendicularly from said frame at a location usually set for said pedal means of a bicycle;
a front snowboard like implement and a rear snowboard like implement;
said front snowboard like implement being mechanically fastened to a fork on said frame by way of a front bracket;
said front bracket being mechanically fastened to said front snowboard like implement and rotationally attached to said fork;
said rear snowboard like implement being mechanically fastened to said frame by way of a rear bracket;
said rear bracket being fixedly attached to said rear snowboard like implement;
said front snowboard like implement having rotational capability along a horizontal axis which is limited by way of a blocker and is biased, by way of a double spring in such a way so as to maintain said front snowboard like implement level;
said front part of said rear snowboard like implement having an anti torsion device being made out of two distinct and separate parts: a bottom plate, which is fixedly attached to said rear snowboard like implement, and an abutment part which is fixedly attached to a wheel crank mount of said bicycle frame;
said bottom plate having a nut protruding perpendicularly therefrom and which sits within said abutment part by way of an opening.

* * * * *